United States Patent
Fernandes

(10) Patent No.: US 9,953,492 B2
(45) Date of Patent: Apr. 24, 2018

(54) CONFIGURABLE MACRO BUTTON FOR VOICE SYSTEM ACTIVATION BY ALARM SYSTEM OPERATOR

(71) Applicant: Siemens Schweiz AG, Zurich (CH)

(72) Inventor: Eric Fernandes, Florham Park, NJ (US)

(73) Assignee: Siemens Schweiz AG, Zürich (CH)

( * ) Notice: Subject to any disclaimer, the term of this patent is extended or adjusted under 35 U.S.C. 154(b) by 0 days.

(21) Appl. No.: 15/303,716

(22) PCT Filed: Apr. 18, 2014

(86) PCT No.: PCT/US2014/034683
§ 371 (c)(1),
(2) Date: Oct. 12, 2016

(87) PCT Pub. No.: WO2015/160364
PCT Pub. Date: Oct. 22, 2015

(65) Prior Publication Data
US 2017/0032629 A1    Feb. 2, 2017

(51) Int. Cl.
| G08B 17/00 | (2006.01) |
| G08B 3/10 | (2006.01) |
| H04R 27/00 | (2006.01) |
| H04R 29/00 | (2006.01) |
| G10L 15/22 | (2006.01) |

(52) U.S. Cl.
CPC ............. *G08B 3/10* (2013.01); *G08B 17/00* (2013.01); *G10L 15/22* (2013.01); *H04R 27/00* (2013.01); *H04R 29/007* (2013.01); *G10L 2015/223* (2013.01); *H04R 2227/003* (2013.01)

(58) Field of Classification Search
CPC ........ H04M 11/04; H04M 11/045; G08B 7/06
USPC ........................................................ 340/506
See application file for complete search history.

(56) References Cited

U.S. PATENT DOCUMENTS

| 3,798,672 | A | * | 3/1974 | Gregg, Jr. ............ H04M 11/045 |
| | | | | 340/501 |
| 4,816,809 | A | * | 3/1989 | Kim ....................... G08B 17/00 |
| | | | | 340/584 |
| 6,518,878 | B1 | * | 2/2003 | Skoff ........................ G08B 7/06 |
| | | | | 340/506 |
| 8,626,112 | B2 | * | 1/2014 | Ray ...................... G10L 13/043 |
| | | | | 455/404.1 |
| 2005/0201541 | A1 | * | 9/2005 | Berezowski ............ G08B 3/10 |
| | | | | 379/170 |
| 2006/0039541 | A1 | | 2/2006 | Takahashi et al. |
| 2011/0193724 | A1 | | 8/2011 | Cases et al. |
| 2012/0154141 | A1 | | 6/2012 | Piccolo, III |

(Continued)

OTHER PUBLICATIONS

Anonymous: "Firefinder-XLS Control Panel: Operation and Maintenance Manual", Apr. 21, 2013, XP055158947, retrieved on Dec. 16, 2014 from internet: URL:http://www.almaschools.net/downloads/manuals/ahs_fire_alarm_manual_20130421_065954_2.pdf, 72 pages.

(Continued)

*Primary Examiner* — Daniel Abebe

(57) ABSTRACT

An approach for configuring macro buttons for voice system activation in an alarm system by an alarm system operator that simplifies application of multiple activation and deactivation voice messages during fire alarm events and mass notification events.

17 Claims, 6 Drawing Sheets

(56) References Cited

U.S. PATENT DOCUMENTS

2013/0024800 A1  1/2013  Sundriyal et al.

OTHER PUBLICATIONS

Anonymous: "Firefinder XLS datasheet—Google Search", Dec. 16, 2014 XP055158942, retrieved form internet: https://www.google.de/?gws_rd=ssl#q=firefinder%20xls%20datasheet, 12 pages.
PCT Search Report dated Jan. 5, 2015, for PCT Application No. PCT/US2014/034683, 13 pages.

* cited by examiner

CONFIGURABLE MACRO BUTTON FOR VOICE SYSTEM ACTIVATION BY ALARM SYSTEM OPERATOR

1. FIELD OF THE INVENTION

This application relates to the field of emergency notifications from alarm systems and more particularly to notification events in a fire alarm system.

2. BACKGROUND

In alarm systems, such as building fire alarm systems, it is desirable to have audio capabilities. Audio capabilities enable audible annunciation emergency messages to be passed between fire control panels and/or audio panels in a fire alarm system and also to be played when mass notification is required. As audio capabilities in the form of mass notification systems have been integrated with traditional building fire alarm systems, a need has arisen for making it easier to select multiple fire alarm messages, operator-initiated messages, and mass notification messages and apply these messages to the appropriate users and sites.

During the operation of a traditional emergency voice/fire alarm system, an emergency operator (such as a firefighter or building security officer) is often required to apply an emergency or convenience message to, or to request a page on, one or more speaker zones throughout a site. The choice of output zones to which a message or page is desired is often made dynamically in the selection of output zones and the desired message or page.

In many cases, an emergency situation requires that multiple operations be performed on more than one speaker group. Various customer, regulatory, and/or local jurisdictions may have requirements with specific action sequences. Such operations sequences currently require multiple operations and steps via multiple button presses of individual speaker zones to apply the requested operations. The multiple button presses can result in errors in an emergency situation. An example situation is when there is a need to evacuate a portion of a site or building. To evacuate one section of a building while alerting the remaining sections of a building, multiple actions are required. An "All Alert" would have to be activated, "Selective Evacuation" activated, and one or more "Speaker Zones" applied to the "Selective Evacuation."

What is needed in the art is an approach for grouping multiple button presses and steps into a reduced number of button presses that reduces mars and increases the speed that emergency information is disseminated at a site while complying with all applicable regulatory, Authorities Having Jurisdiction (AHJ) (as defined by the National Fire Protection Association or as extended by local fire authorities), and customer/building codes, standards, and rules and regulations.

SUMMARY

In accordance with one embodiment of the disclosure, a safety alarm system is described. A fire and voice panel with a plurality of buttons or switches is configured such that the activation of one button or switch results in multiple steps or actions to occur. The multiple steps or actions are defined or scripted as a configurable macro application ("app") that is assigned to a single button, switch, or key.

The creation of the macro app comprising steps or actions may be constrained to a subset of actions that the fire and voice panel may activate. The steps and actions of the macro app may also be prioritized, such that higher priority events previously activated will not be displaced or deactivated by the actions of the macro app when executed.

The above described features and advantages, as well as others, will become more readily apparent to those of ordinary skill in the art by reference to the following detailed description and accompanying drawings. While it is desirable to provide audio path monitoring or other advantageous features to alarm systems and other building automation systems, the teachings disclosed herein extend to those embodiments which fall within the scope of the appended claims, regardless of whether they accomplish one or more of the above-mentioned advantages.

DESCRIPTION

An example approach for configuring buttons, switches, and keys to perform multiple steps or actions upon a single activation by an operator of a voice station comprising a fire and voice control panel in a safety alarm system is presented. In the example, macro functionality, i.e., a sequence of instructions, may be assigned to a button and may be configured via a PC-based configuration toot with a specific set of operations to be performed upon a single press of the button.

Figure 1:
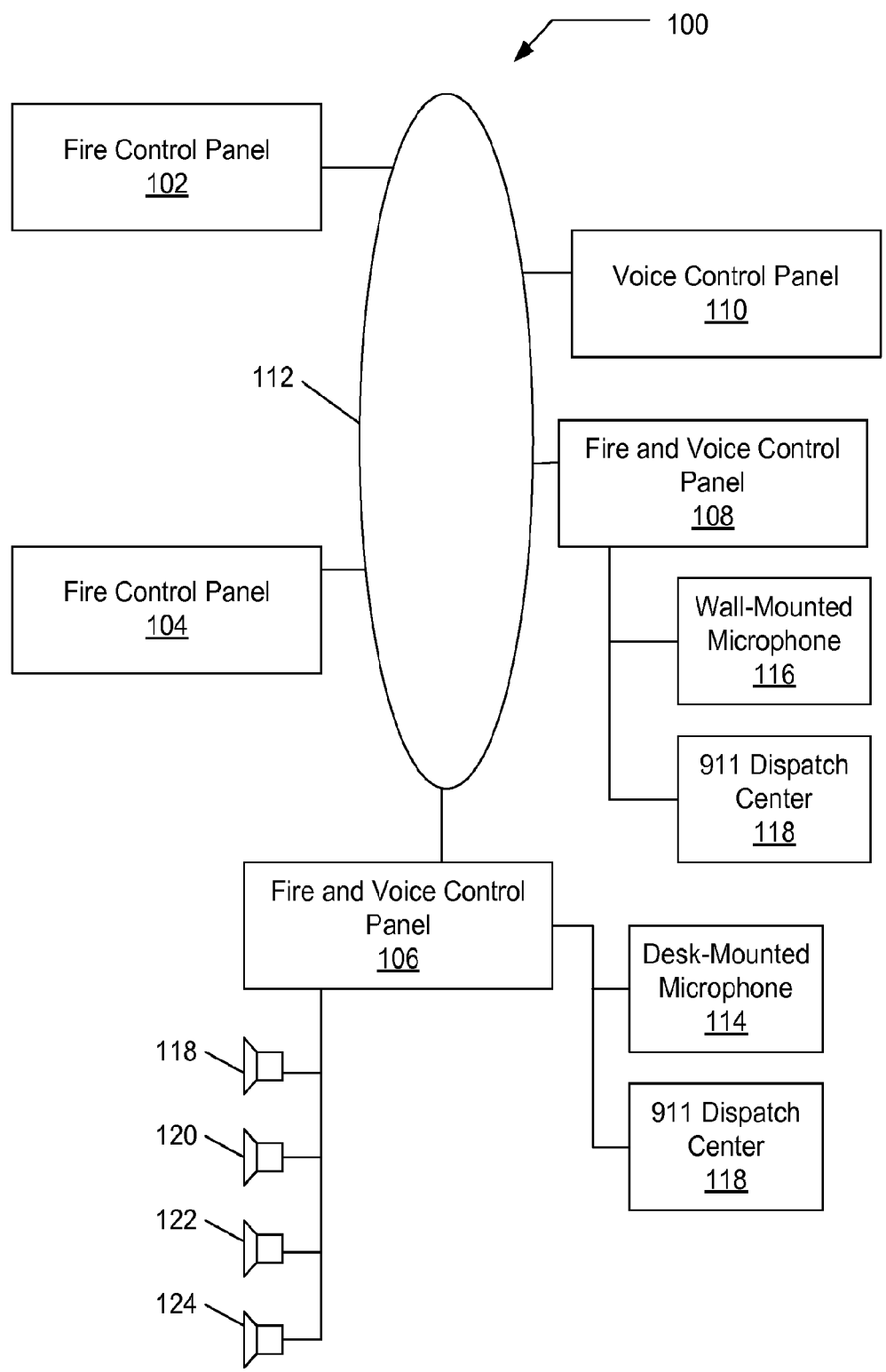
FIG. 1 is an exemplary topology diagram for a building fire alarm system.

With reference to FIG. 1, an exemplary topology diagram 100 for a building fire and audio alarm system approach is shown. The building fire and audio alarm system may have numerous fire control panels 102 and 104, fire and voice control panels 106 and 108, and voice control panel 110. In other implementations there may be more or fewer devices in the system. In yet other implementations, additional panels such as security panels or HVAC control panels may be present. The panels 102-110 may be networked together by a data network 112. The data network 112 may have a physical layer of wire, radio waves, fiber optic cables, coaxial cable, or a combination of any of the above. Over the physical layer, additional protocol layers may be implemented to carry data, such as a TCP/IP network (commonly called the Internet). The data network 112 may be configured as a local area network (LAN) that connects only the control panels and building automation systems.

A fire and voice control panel, such as fire and voice control panel 106, may have associated a desk-mounted microphone 114 or a wall-mounted Remote Microphone Station 116, and connections to emergency centers, such as a 911 dispatch center 118. Additionally, the fire and voice control panel 106 may have audio outputs for connection to speakers, such as speakers 118-124 or amplifiers (not shown). Likewise, the voice control panel 110 may have associated a desk-mounted microphone or a wall-mounted Remote Microphone Station, and connections to emergency centers, as well as audio outputs for connection to speakers and amplifiers. The fire and voice control panel 106 may also have multiple buttons where the buttons may be assigned to specific tasks, such as selecting speaker zones and messages to be played in those zones. In other implementations, the desk-mounted microphone may be an internal microphone or other audio input device.

Figure 2:
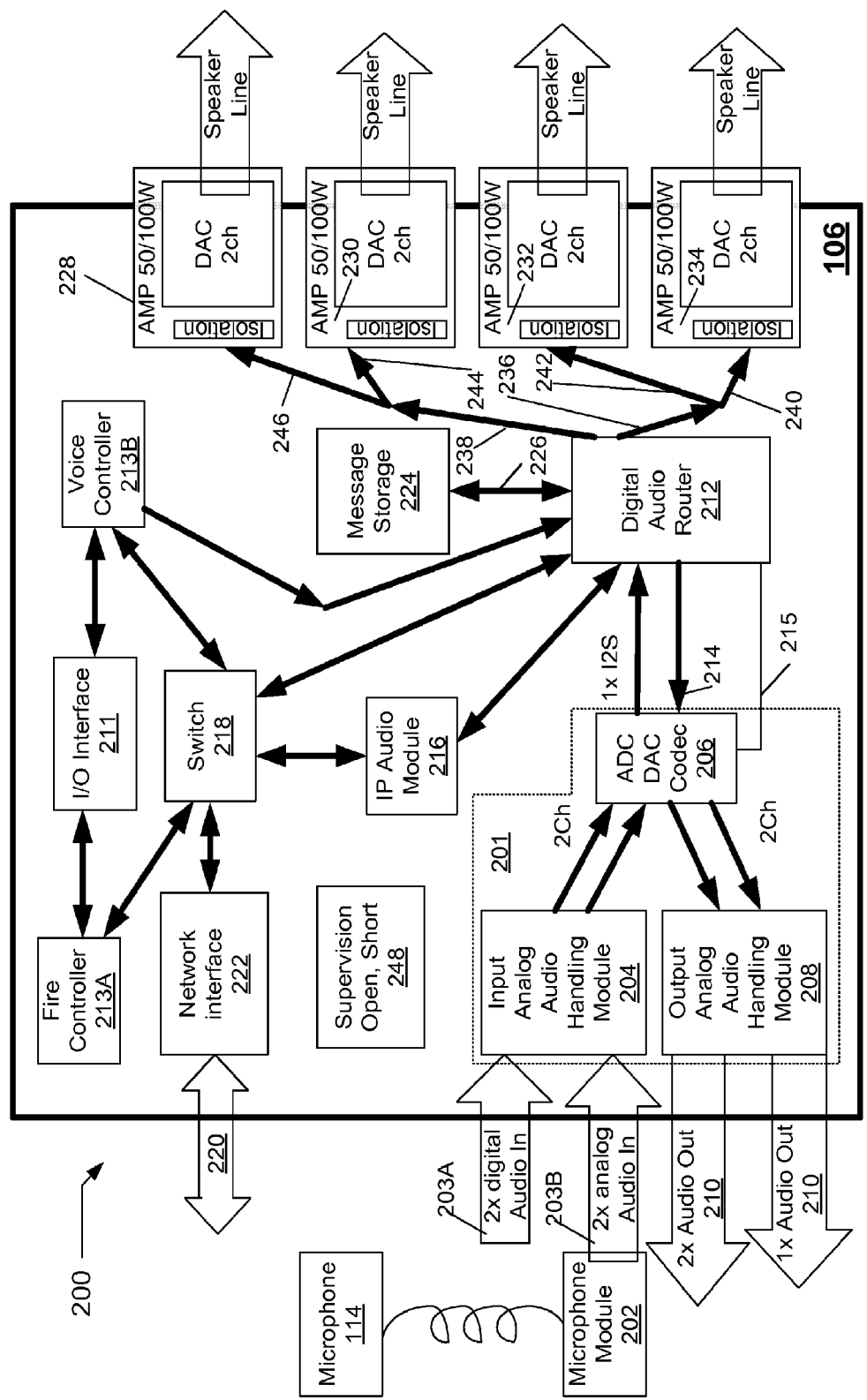
FIG. 2 is a block diagram of the fire and voice control panel of FIG. 1 depicted in accordance with an example implementation of the invention.

Turning to FIG. 2, a block diagram 200 of the fire and voice control panel 106 is depicted in accordance with an example implementation of the invention. The desk-mounted microphone 1114 may be connected to a microphone module 202 that supports one or more audio inputs 203 (two in the current example). The microphone module 202 may be in signal communication with analog audio module 201 comprising an input analog audio handling module 204, an ADC DAC codec 206, and an output analog audio handling module 208. The input analog audio handling module 204 may provide separate channels to the ADC DAC codec 206 that is able to handle two audio channel inputs. The ADC DAC codec 206 may have a 48 kHz sampling rate with at least a 116 bit resolution. The analog to digital converter (ADC) and digital to analog converter (DAC) in the ADC DAC codec 206 may be implemented as slave devices. The analog channels may then be routed to the output analog audio handling module 208 for transmission on one of the analog outputs 210.

The ADC DAC codec 206 also communicates with digital audio router 212 that may be implemented with a field-programmable gate array (FPGA) via a two-way I2S audio bus 214. An I2S audio bus (also called I²S, Inter-IC Sound, Integrated Interchip Sound, or IIS) is an electrical serial bus interface that consists of three lines: 1) a bit clock line; 2) a word clock line; and 3) at least one multiplexed data line. It may also include a master clock and a multiplexed data line for upload. Typically the I2S audio bus 214 carries pulse-code modulation (PCM) digital audio data or signals. The I2S allows two channels to be sent on the same data line. The two channels are commonly called right (R) channel and left (L) channel. The word clock is typically a 50% duty-cycle signal that has the same frequency as the sample frequency. The I2S audio bus 214 may be defined by the Philips Semiconductor I2S bus specification (February 1986, revised Jun. 5, 1996).

The digital audio router 212 enables digitized audio, such as digitized analog audio from microphone 114, that may be provided to an IP audio module 216. The IP audio module 216 converts the digitized audio into voice-over-IP (VOW) encoded data. An example of the IP audio module 216 is IP Audio Module 102 produced by Barix AG. The output of the IP audio module 216 is VOIP encoded data. The VOIP encoded data is made available to a switch 218 that enables the VOIP encoded data to be transported by an IP network (Ethernet 220) via network interface 222 to data network 112, FIG. 1.

The digital audio router 212 may also be connected to memory 224 via a data bus 226, where pre-recorded digitized audio messages may be stored in memory 224. The memory may also store metrics and operational data for the fire and voice control panel's operation. The memory 224 may be implemented as electronic nm-volatile computer storage device that can be electrically erased and reprogrammed, i.e., flash memory. In other implementations, other types of memory such as RAM, DRAM, SDRAM, and EEPROM may be employed.

An input/output (I/O) interface 211 may be coupled to a fire controller 213A and a voice controller 213B, both of which are in signal communication with switch 218, which allows peer-to-peer communications between fire controller 213A and voice controller 213B via network interface 222 and data network 112. The I/O interface 211 provides input devices, such as buttons, keys, lights, displays, and graphical display input devices (e.g., a computer mouse and/or touch screen). The I/O interface 211 may be within the fire and voice control panel 106 or in other implementations it may be external to the fire and voice control panel 106. An example of an I/O interface 211 is the Firainder XLS Person Machine Interface (PMI) produced by the Building Technologies Division of Siemens Industry, Inc.

The fire controller 213A and the voice controller 213B may be located on separate printed circuit boards (PCBs), and their respective PCBs may exist in the same enclosure (106) or in separate enclosures (102, 104, 110). The voice controller 213B may receive input from any of the following: from an external Mass Notification system via digital input; from a user/operator via the I/O interface 211; from the fire controller 2113 via data network 112; and from other voice controllers via data network 112. The voice controller 213B may also be in direct signal communication with the digital audio router 212 via switch 218. The fire controller 213A may receive input from any of the following: from fire detection equipment (detectors, pull stations, CO monitors, etc.); and from an external Mass Notification system via digital input; and from other fire controllers via data network 112. The fire controller 213A may also be in direct signal communication with the digital audio router 212 via switch 218 and IP audio module 216.

One or more amplifiers and/or speakers may be in signal communication with the digital audio router 212, such as amplifiers 228-234 via I2S buses 236 and 238 (two I2S buses are used in the current example). Each of the buses 236 and 238 each have a respective L and R channels, i.e. 240, 242 and 244, 246. The output of each of the amplifiers 228-238 may be connected to speakers 118-124 of FIG. 1 respectively. A supervisory module 248 may monitor the operation of the fire and voice control panel 106.

Figure 3A:
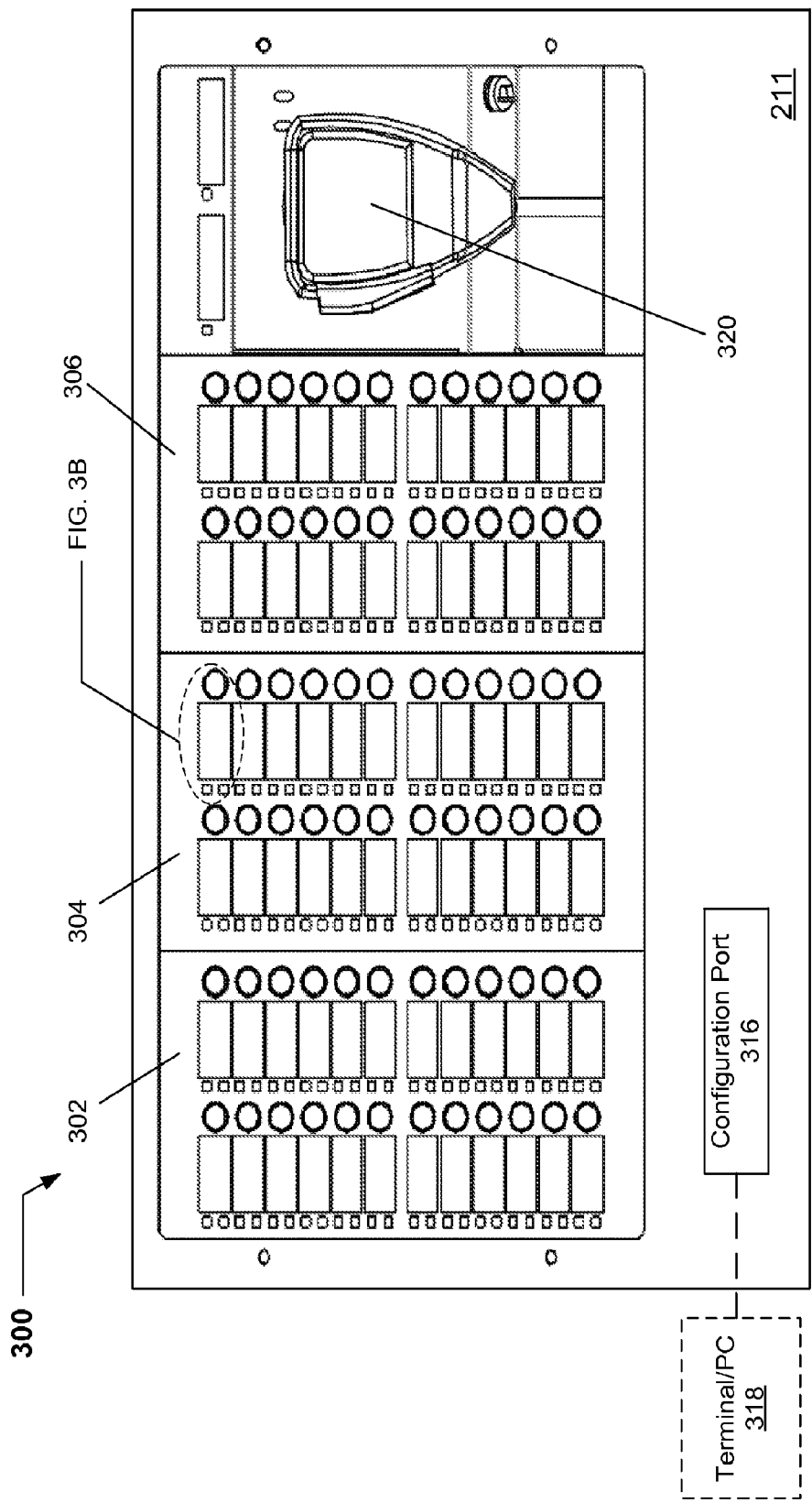
FIG. 3A is a schematic diagram of an input/output (I/O) interface in accordance with an example implementation of the invention.

In FIG. 3A, a diagram 300 of an input/output (I/O) interface 211 (commonly referred to as a panel interface) in accordance with an example implementation of the invention is depicted. The panel interface 211 is a simplified schematic version for purposes of describing its operational principles. An alert area of the panel interface 211 provides information about the status of the fire and voice control panel 106 and system. This information is typically provided by lamps, light-emitting diode (LED) displays and/or graphical displays. The lamps and/or LEDs may have a color that is associated with a priority assigned to the alarm or event. A set of buttons and switches may be presented for testing and general operation of the fire and voice panel. Another set of buttons and/or switches may be present in an area in the fire and voice control panel 106 for identifying speaker zones and messages that need to be played in the zones.

The panel interface 211 has three switch modules 302, 304, 306, such as, for example, Operator Switch Module (Model VTO2005A1) which will be commercially available from Siemens Industry, Inc, in June 2014, with each module containing 24 buttons. Each of the buttons may be configured to perform a pre-programmed sequence of manual operations of assigning speaker zones and voice messages.

The programming of this sequence may occur via a configuration tool that connects to the configuration port 316. The configuration port 316 may connect a terminal device 318, such as a personal computer (PC), to the fire and voice control panel 106. Once connected, a menu or other information may be generated by the fire and voice control panel 106 and presented on the terminal device. Typically the defining of buttons and switches would only occur when the fire and voice control panel 106 is in a configuration mode and not when in an operational mode. Thus, operators are prevented from accidentally removing or reconfiguring buttons.

In a configuration mode, the terminal device 318 may create a macro of actions and rules to be accessed by buttons or switches of panel interface 211. These actions may include implementing AHJ actions and rules. As an example, in a site with a local jurisdiction constraint of "evacuation on the floor of incident, the floor above, and floor below and alert everywhere else of incident," a macro app may be created and named "Floor five alarm." As explained in further detail herein, a macro app such as the "Floor five alarm" macro app, when assigned to a button 322 of a respective switch device 330 of a switch module 302, 304, 306 and activated by an operator, would cause the voice controller 213B to fetch and deliver pre-defined messages associated with voice controls identified in this macro app to evacuate floors 4, 5, and 6 of a site, and play the alert message on all other floors. The "Floor five alarm" macro app may be assigned to a specific button 322 via the terminal 318. An appropriate installer-printed paper label may then be inserted into label holder 350 positioned on the I/O interface 211 by the operator. The labels are intended to provide meaningful guidance to the operator. For example, they may display macro app names (e.g., "Request Access") or they may have site-specific data (e.g., "Evac Lobby" or "Page to Wing A"). The I/O interface 211 may also include a microphone module 320 for live paging.

Figure 3B:
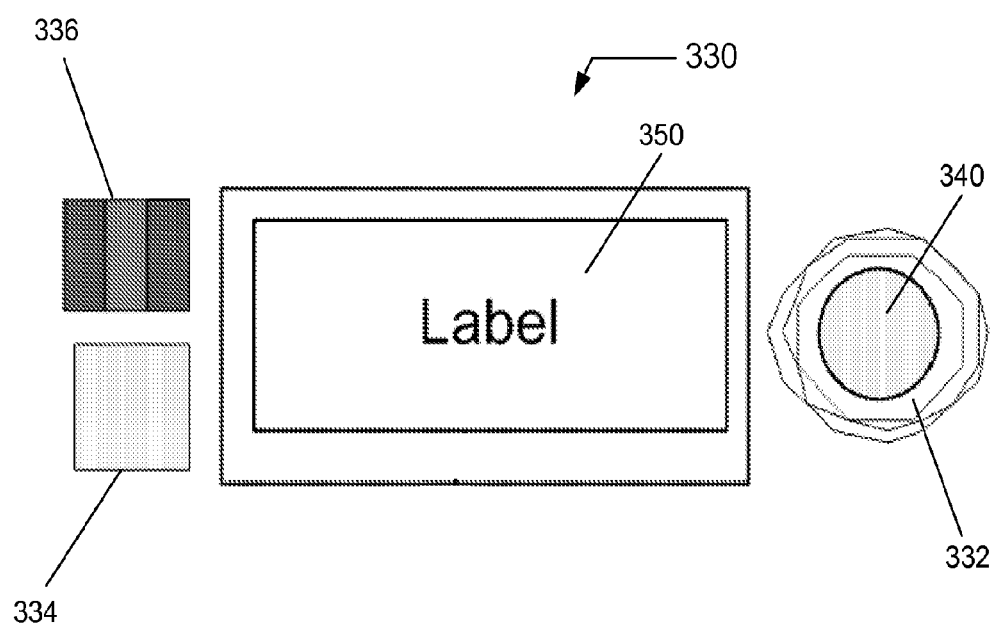
FIG. 3B is an illustration of the layout of a switch device of the I/O interface shown in FIG. 3A.

FIG. 3B is an illustration of the layout of the switch devices contained in the three switch modules 302, 304, 306 of FIG. 3A. Switch device 330 may include three lamps 334, 336, 340 and one button 332 (with one of the lamps (340) integrated into the button 332). The button 332 may be used to provide input to the panel interface 211. The button press lamp 340 may confirm a valid button press when lit (with a yellow lamp). Lamp 336 may operate as a lamp having three separately activated colors (e.g., red/green/blue) where each color may be defined and recognized by Voice Controller 213B to reflect the type of message application type or by the priority of the application, i.e., red steady ON for first priority type (e.g., named Evac) or red blink ON for second priority type (e.g., named Alert), green for third priority type (e.g., emergency page), and blue for fourth priority type (e.g., named mass notification page). In one implementation, lamp 336 may be a light-emitting diode (LED) array having three separate bulbs or lamps. Lamps 334, 336, 340 may have an ON. OFF or BLINK (i.e., flashing) states set or controlled by the Voice Controller 213B in accordance with the present invention as explained in further detail herein. As described herein, once a macro app is assigned by the Voice Controller 213B to a specific button 322 via the terminal 318, the appropriate label may be placed in label holder 350 by an operator of fire and voice control panel 106 to reflect the macro app assigned to the button 322. Lamp 334 (which also may be an LED) is controlled by the Voice Controller 213B to reflect a fault state of the voice controls identified by the macro app assigned to the button 322 of the respective switch device 330 having the lamp 334.

Figure 4:
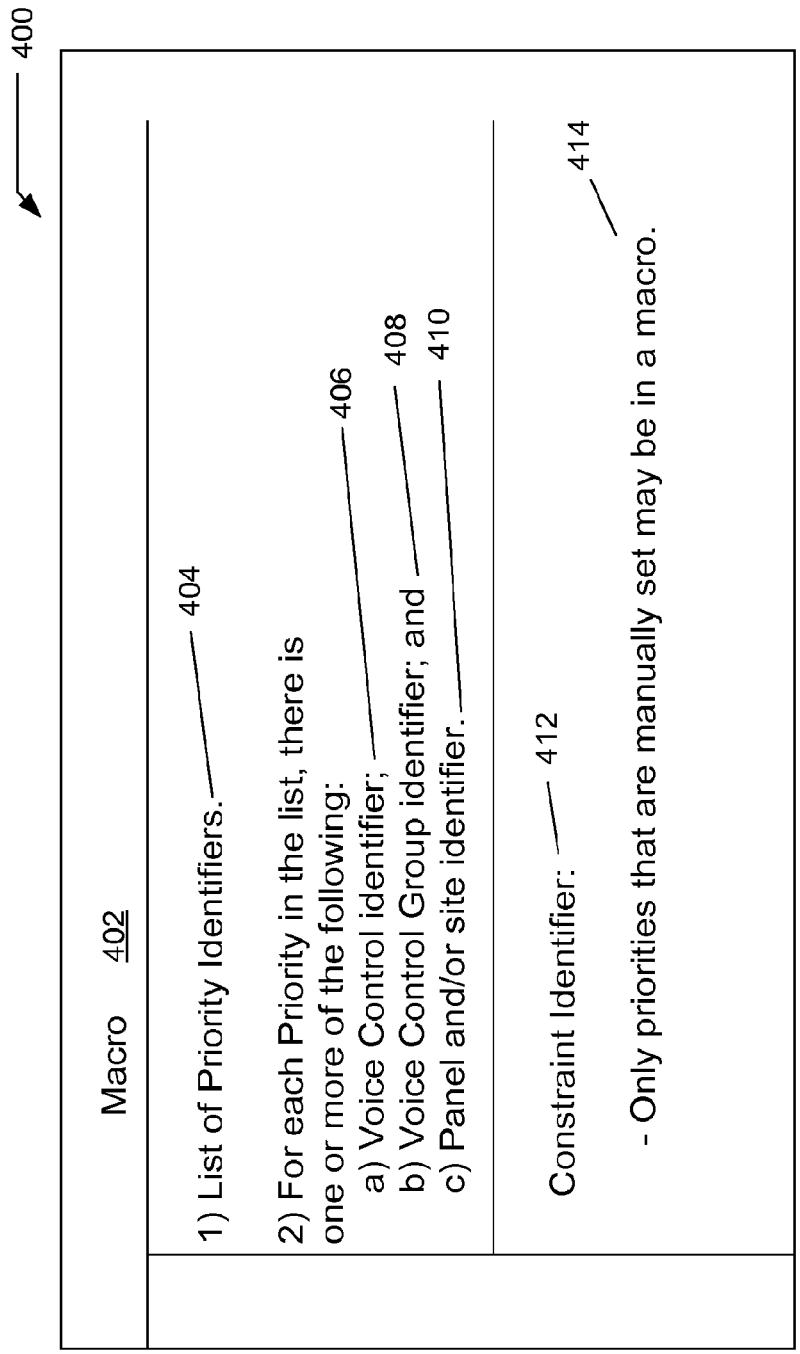
FIG. 4 is an illustration of the parts of a macro app in accordance with an example implementation.

Turning to FIG. 4, an illustration 400 of the parts or elements of a macro app 402 in accordance with an example implementation is depicted. When a macro app is assigned to a button or switch, the macro app 402 may have a list of priorities 404 assigned to it from a global priority table that identifies what actions are to take precedence over others. For example, an "evacuate the whole site" action might be assigned the highest priority where other actions of the macro app are assigned a lower priority. Some automatic actions might also have a higher priority than a manual or discretionary action.

Within the macro app 402, the priorities of the different actions are also configured with its own list of Voice Controls or equivalents. Thus, for each assigned priority in the list of priorities 404, a Voice Control 406, Voice Control Group 408, and Panel and/or Site 410 are defined. The Voice Control 406 is a collection of one or more speaker circuits of an emergency voice/fire alarm system; a Voice Control Group 408 is a collection of one or more Voice Controls; and Panel and/or Site 410 refers to building and/or site locations of the emergency voice/fire alarm system. The macro app 402 may also have constraints 412 for defining the macro app by an operator or user via terminal 318 white the panel 106 and the Voice Controller 213B is in configuration mode. For example, one constraint may be a rule that requires any assignment of a "mass notification" priority type to be the highest priority assigned within the respective macro app 414.

Figure 5:
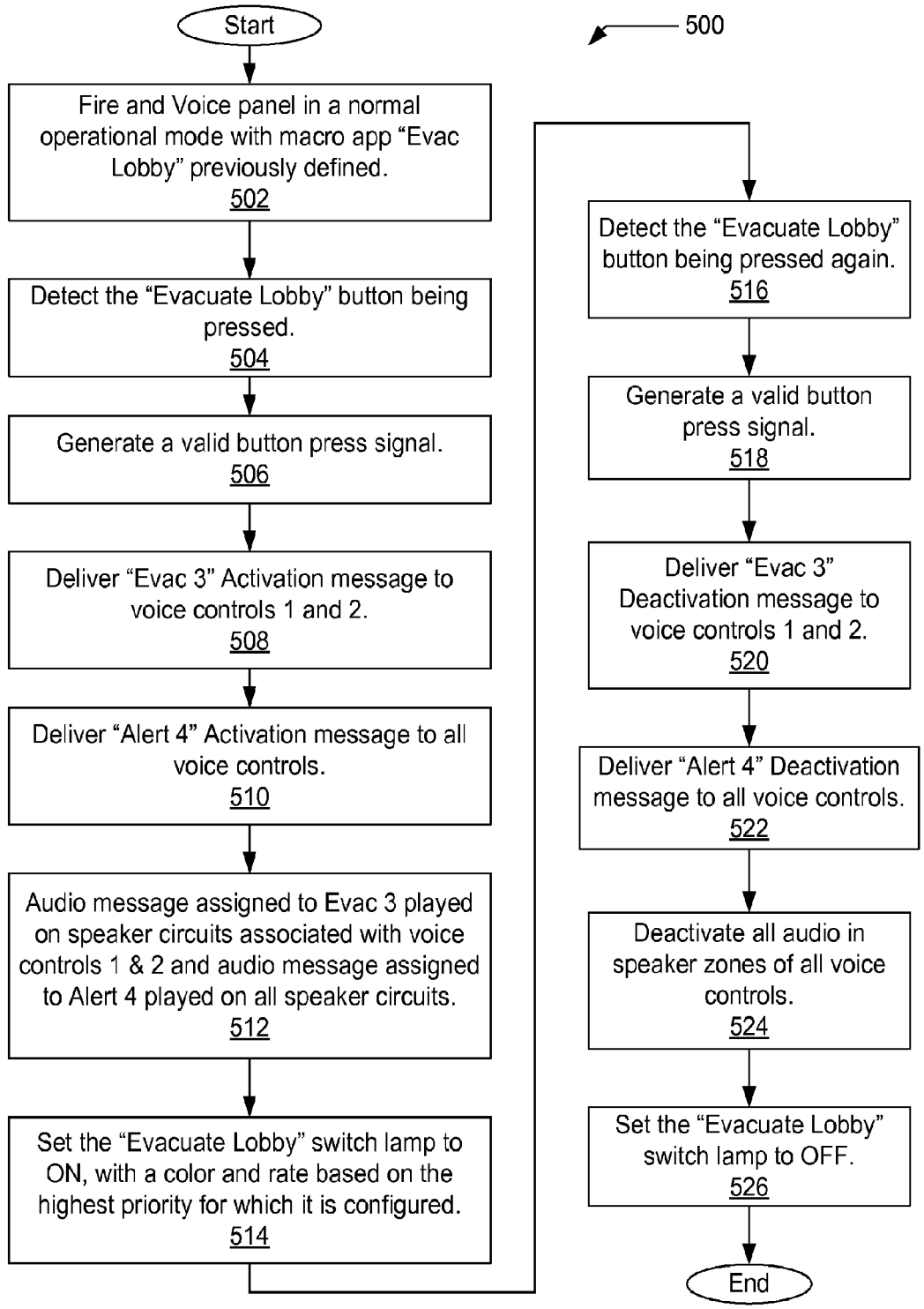
FIG. 5 is a flow diagram of an approach for using macro apps in the fire and voice control panel of FIG. 1 in accordance with an example implementation of the invention.

In FIG. 5, a flow diagram 500 of an approach for using macro apps in lire and voice control panel 106 of FIG. 1 in accordance with an example implementation of the invention is shown. In step 502, the fire and voice control panel 106 and voice controller 213B are in a normal operational mode (and no longer in a configuration mode) with a previously-defined macro app having been assigned to a button 322 of a switch device 330 in accordance with the present invention. In the example shown in FIG. 5, the previously-defined macro app is named or identified as "Evac Lobby" and defined below for purposes of illustrating the approach or process 500. The "Evacuate Lobby" switch lamp 336 of the switch device 330 is initially set or turned to off or inactive state by the Voice Controller 213B; all voice controls identified in and associated with the macro app "Evac Lobby" assigned to the button 322 are set by Voice Controller 213B to the off or inactive state. It is assumed for the purpose of describing the approach or process 500 that an operator may be at the tire and voice control panel 106 in view of the interface panel 211 in order to activate the respective button 322 assigned to a macro app.

Continuing with the example for "Evac Lobby", the macro app identified as "Evac Lobby" may be assigned to button 332, FIG. 3B, and pre-defined as follows in accordance with the parts of a macro app as shown in FIG. 4:

Macro: Evac Lobby
   a. Priority Identifier=Evac 3
     i. Voice Control Identifier=Voice Control 1 {voice control 1 located in Lobby}
     ii. Voice Control Identifier=Voice Control 2 {voice control 2 located in Lobby} b. Priority identifier=Alert 4
   i. Site Control Identifier=Site;
      where Evac 3 identities a first priority type "Evac" and a "priority number" of "3", and Alert 4 identifies a second priority type "Alert" and a priority number of "4".

When an event occurs requiring the evacuation of an area (such as the lobby) at the site monitored by the panel 106, the following actions may occur in accordance with the approach or process 500 performed by the panel 106 and the Voice Controller 213B. The operator of the voice station where interface panel 211 is located would press an "Evacuate Lobby" button (332 of switch device 330, FIG. 3B). In step 504, the Voice Controller 213B of fire and voice control panel 106 detects the pressing or activation of the button 322 and recognizes the corresponding macro app, assigned to the activated button 332. In response to the detection of the activation of the button 322, the Voice Controller 213B may generate a valid button press signal in step 506, such as an audible beep, via an annunciator (not shown in figures) on the switch module 302, 304 or 306 having the switch device 330 with the detected actuated button 322. The fire and voice panel 106 then delivers via the voice controller 213B an "Evac 3" Activation message to Voice Controls 1 and 2 associated with a first priority identifier in step 508. The fire and voice control panel 106 may also deliver via voice controller 213B an "Alert 4" Activation message associated with a second priority identifier to all Voice Controls in the site in step 510. Thus, in the current example an Alert 4 Activation message is also delivered to Voice Controls 1 and 2. In another implementation, the Voice Controller 213B may be configured to deliver Alert 4 Activation messages to every Voice Control in the site except for the Voice Controls that receive the audio messages associated the first priority identifier (e.g., "Evac 3" Activation message, i.e., Voice Controls 1 and 2).

In step 512, the audio message assigned to Evac 3 is played on the speakers of the speaker zones containing Voice Controls 1 and 2, and the audio message assigned to Alert 4 is played on the speakers of the speaker zones containing each of the Voice Controls of all speaker zones of the site. In other examples, macro app "Evac Lobby" may be configured such that the audio message assigned to Alert 4 is not played on the speakers of the speaker zones containing Voice Controls 1 and 2.

In step 514, fire and voice control panel 106 via the voice controller 213B, in response to the first pressing of button 332, sets the "Evac Lobby App" switch lamp 336 to the ON state, with a color and rate based on the priority type of the priority identifier specified in the macro app "Evac Lobby" assigned to the button 322. In this approach for using macro apps, the Evac 3 messages (with priority number of 3) have a higher priority than the Alert 4 messages (with a priority number of 4). The "Evac Lobby App" switch lamp 336 of switch device 300, which may be an LED array, may be located in an alert area of FIG. 3A, for example, switch module 304. Because of the priority type of Evac, lamp 336 is lit with a steady red color.

The operator may then press the Evacuate Lobby button 332 a second time in step 516, causing the voice controller 213B to deactivate the alarm. A valid button press signal in step 518 is then generated (an audible beep.) The voice controller 213B of fire and voice control panel 106, in response to detecting the second pressing of button 332, then delivers an "Evac 3" Deactivation message to Voice Controls 1 and 2 in step 520 and an "Alert 4" Deactivation message to all Voice Controls in step 522. In step 524, all audio in the speaker zones of all Voice Controls are deactivated. The "Evacuate Lobby" switch lamp is then turned off in step 526 and the process terminates.

It will be understood, and is appreciated by persons skilled in the art, that one or more processes, sub-processes, or process steps described in connection with FIG. 5 may be performed by hardware and/or software (machine readable instructions). If the approach is performed by software, the software may reside in software memory (which may reside in internal or external memory of voice controller 213B) in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a read only memory (RAM) (electronic), a read-only memory (ROM) (electronic), an erasable programmable read-only memory (EPROM or Flash memory) (electronic) and a portable compact disc read-only memory (CDROM) (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the approach for configurable macro button for voice system activation by an alarm system operator has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

The invention claimed is:

1. A method of configuring and operating a voice system located at a site having one or more voice stations and a plurality of voice controls logically grouped within a plurality of speaker zones of the site, where each speaker zone contains at least one voice control, the method comprising:
   storing pre-defined audio messages in a memory;
   assigning one or more of the pre-defined audio messages to each priority identifier of a first plurality of priority identifiers;
   providing a macro application (app) comprising a second plurality of selected priority identifiers from the first plurality of priority identifiers; and
   associating the macro app with a unique switch device of an input/output (I/O) interface of the voice station.

2. The method of configuring and operating the voice system of claim 1, where the selected priority identifiers correspond to at least one voice control or all voice controls contained within the speaker zones of the site.

3. The method of configuring and operating the voice system of claim 2, where the step of providing the macro app further includes the step of assigning a priority type and a priority number to each of the selected priority identifiers.

4. The method of configuring and operating the voice system of claim 1, further comprising the step of activating the macro app in response to activation of the unique switch device by pressing the button.

5. The method of configuring and operating the voice system of claim 4, where the step of activating the macro app further includes delivering predefined audio messages associated with a priority identifier to speaker zones as determined by the voice controls of the associated priority identifier.

6. The method of configuring and operating the voice system of claim 5, further comprising the step of deactivating the macro app in response to detecting the deactivation of the unique switch device.

7. The method of configuring and operating the voice system of claim 1, where the priority identifier comprises a priority type and a priority number.

8. The method of configuring and operating the voice system of claim 1, where the step of providing a macro app further includes:
   receiving an input reflecting one of the priority identifiers through a configuration tool in signal communication with the voice station; and
   responsive to the input, selecting and associating one or more of the predefined audio messages to the one of the priority identifiers.

9. The method of configuring and operating the voice system of claim 8, where the configuration tool is a personal computer in signal communication with the voice system.

10. A safety alarm system, comprising:
   a control panel;
   a memory in signal communication with the control panel that has stored therein a plurality of predefined audio messages that are each associated with a safety alarm event and assigned to one or more speaker zones of a building or site;
   at least one audio output device associated with each speaker zone;
   an input/output (I/O) interface configured to receive input from an operator of the safety alarm system;
   a data network connecting the control panel, the at least one audio output device, and the I/O interface; and
   a macro application (app) comprising a plurality of priority identifiers, each having one or more assigned predefined audio messages that are activated responsive to an input from the operator through the I/O interface,
   wherein the control panel further includes:
      a configuration port; and
      a configuration tool that connects to the control panel through the configuration port and that is enabled to configure the macro app with a sequence of alarm event operations assigned to a button of a plurality of buttons.

11. The safety alarm system of claim 10, where each of the priority identifiers comprises a priority type and a priority number.

12. The safety alarm system of claim 10, where the I/O interface includes at least one button of a plurality of buttons that is associated with the macro app; and in response to the activation of the at least one button, the I/O interface signals the control panel to deliver the one or more assigned audio messages based on the priority identifiers of the macro app.

13. The safety alarm system of claim 12, where each button of the plurality of buttons is associated with a lamp that indicates an additional state of the corresponding safety alarm event.

14. The safety alarm system of claim 12, where the safety alarm events comprise fire alarm events, mass notification events, and operator-initiated events.

15. The safety alarm system of claim 10, where the configuration tool is a personal computer in signal communication with the control panel.

16. A control panel comprising:
   a voice controller;
   a memory coupled to the control panel that has stored therein a plurality of macro applications (apps) each having priority identifiers having assigned predefined audio messages that are each associated with a safety alarm event and assigned to one or more speaker zones of a building or site; and
   an input/output (I/O) interface configured to receive an input from an operator of the control panel and provide the received input to the voice controller,
   wherein, responsive to the input, the voice controller processes one of the macro apps assigned to the input and delivers a plurality of the predefined audio messages to one or more voice controls based on the assigned macro app,
   wherein the assigned macro app includes two priority identifiers, a first of the two priority identifiers having a first of the voice controls and the second of the two priority identifiers having a site identifier that corresponds to all of the voice controls, and
   wherein, when the voice controller processes the site identifier of the assigned macro app, the voice controller delivers all of the predefined audio messages associated with the second priority identifier to all of the voice controls except for the voice controls associated with the first priority identifier.

17. The control panel of claim 16, where the input of the I/O interface includes at least one button of a plurality of buttons that is associated with the assigned macro app.

* * * * *